(12) United States Patent
Palmer et al.

(10) Patent No.: US 11,758,877 B2
(45) Date of Patent: Sep. 19, 2023

(54) VACUUM PUMP ARRANGEMENT FOR A MILKING PLANT

(71) Applicant: DELAVAL HOLDING AB, Tumba (SE)

(72) Inventors: Fredrik Palmer, Tumba (SE); Lars Wiberg, Tumba (SE)

(73) Assignee: DeLaval Holding AB, Tumba (SE)

( * ) Notice: Subject to any disclaimer, the term of this patent is extended or adjusted under 35 U.S.C. 154(b) by 272 days.

(21) Appl. No.: 16/978,589

(22) PCT Filed: Mar. 7, 2019

(86) PCT No.: PCT/SE2019/050199
§ 371 (c)(1),
(2) Date: Sep. 4, 2020

(87) PCT Pub. No.: WO2019/177516
PCT Pub. Date: Sep. 19, 2019

(65) Prior Publication Data
US 2021/0029957 A1 Feb. 4, 2021

(30) Foreign Application Priority Data

Mar. 12, 2018 (SE) .................... 1850272-4

(51) Int. Cl.
*A01J 5/007* (2006.01)
*A01J 5/04* (2006.01)
*F04B 9/12* (2006.01)
(52) U.S. Cl.
CPC ............... *A01J 5/048* (2013.01); *A01J 5/007* (2013.01); *A01J 5/047* (2013.01); *F04B 9/1207* (2013.01)

(58) Field of Classification Search
CPC ............. A01J 5/007; A01J 5/047; A01J 5/048
(Continued)

(56) References Cited

U.S. PATENT DOCUMENTS 4,198,999 A * 4/1980 Boudreau .................. A01J 5/04
119/14.25
4,970,989 A * 11/1990 Lidman ................ A23C 9/1422
210/651

(Continued)

FOREIGN PATENT DOCUMENTS

EP 1 369 033 12/2003
WO 02/03780 1/2002

OTHER PUBLICATIONS

International Search Report for PCT/SE2019/050199 dated Jun. 13, 2019, 4 pages.
(Continued)

*Primary Examiner* — David J Parsley
(74) *Attorney, Agent, or Firm* — NIXON & VANDERHYE

(57) ABSTRACT

A vacuum pump arrangement for a milking plant includes a main vacuum conduit with at least two vacuum pump units for maintaining a system vacuum in the main vacuum conduit. Each of the vacuum pump units includes a pump, a vacuum tank connected to the pump by an intermediate conduit, and an inlet conduit connecting the vacuum tank to the main vacuum conduit. A drainage extends from the vacuum tank and includes a draining valve. The pump sucks air from the main vacuum conduit via the inlet conduit, the vacuum tank and the intermediate conduit. The vacuum pump unit includes a closing valve provided on the inlet conduit and configured to close the inlet conduit in an automatic manner when the pump has been stopped.

17 Claims, 2 Drawing Sheets

(58) Field of Classification Search
USPC .................. 119/14.08, 14.25, 14.42, 14.43
See application file for complete search history.

(56) References Cited

U.S. PATENT DOCUMENTS

| | | | |
|---|---|---|---|
| 7,198,003 B2 | 4/2007 | Bosma et al. | |
| 7,311,062 B2* | 12/2007 | Bilgery | A01J 5/047 |
| | | | 119/14.07 |
| 7,757,634 B2* | 7/2010 | Croft | B67D 7/02 |
| | | | 119/14.01 |
| 8,001,930 B2 | 8/2011 | Bosma | |
| 8,381,679 B2 | 2/2013 | Idensjo | |
| 9,399,990 B2 | 7/2016 | Stellnert et al. | |
| 2010/0154715 A1* | 6/2010 | Persson | A01J 7/022 |
| | | | 700/282 |

OTHER PUBLICATIONS

Written Opinion of the ISA for PCT/SE2019/050199 dated Jun. 13, 2019, 6 pages.
Swedish Search Report for SE 1850272-4 dated Oct. 12, 2018, 2 pages.
Brochure from DeLaval, "DeLaval vacuum pumps DVP & DVPF Mordern, trouble-free solutions", Retrieved from the Internet URL: http://www.melkboerdienste.co.za/sites/default/files/vacuum_pumps_DVP_o_DVPF.pdf, 6 pages.

* cited by examiner

VACUUM PUMP ARRANGEMENT FOR A MILKING PLANT

This application is the U.S. national phase of International Application No. PCT/SE2019/050199 filed Mar. 7, 2019 which designated the U.S. and claims priority to SE Patent Application No. 1850272-4 filed Mar. 12, 2018, the entire contents of each of which are hereby incorporated by reference.

TECHNICAL FIELD OF THE INVENTION

The present invention refers to a vacuum pump arrangement for a milking plant comprising a main vacuum conduit, according to the preamble of claim 1. The present invention also refers to a method of operating a vacuum pump arrangement for a milking plant comprising a main vacuum conduit, wherein the vacuum pump arrangement comprises at least two vacuum pump units for maintaining a system vacuum in the main vacuum conduit, each of the vacuum pump units comprising a pump, a vacuum tank connected to the pump by an intermediate conduit, at least a first inlet conduit connecting the vacuum tank to the main vacuum conduit, and a drainage extending from the vacuum tank and comprising a draining valve.

BACKGROUND OF THE INVENTION AND PRIOR ART

In milking plants, especially large milking plants, such a vacuum pump arrangement with several vacuum pump units provides and maintains a system vacuum. The system vacuum provides a sufficiently low pressure for the milking vacuum and pulsating vacuum. It is important to be able to maintain the system vacuum without being forced to shut it down from time to time.

However, since the individual vacuum pump units of the vacuum pump arrangement need to be shut down periodically for draining and maintenance purposes, at least one of the vacuum pump units has to be operating in order to be able to maintain the system vacuum of the milking plant. The vacuum pump units of the vacuum pump arrangement may operate in various ways, for instance alternately, according to the master and slave principle, etc.

Complex solutions have been proposed for enabling draining of water from the vacuum tank of the vacuum pump units, preferably one at the time, without shutting down the system vacuum.

U.S. Pat. No. 8,381,679 discloses a method in a milking system for creating a required vacuum level, the milking system comprising at least two variable speed vacuum pumps. The method comprises the steps of: utilizing a first variable speed vacuum pump for creating the required vacuum level within the milking system; monitoring the vacuum level requirement within the milking system, and when the vacuum level requirement of the milking system is such that the speed of the first variable speed vacuum pump reaches a first speed threshold then: starting a second variable speed vacuum pump, and running the first and second variable speed vacuum pumps in parallel for creating the required vacuum level.

SUMMARY OF THE INVENTION

The purpose of the present invention is to provide an improved possibility to shut down a vacuum pump unit without shutting down the system vacuum of a milking plant. In particular, it is aimed at a possibility to drain a vacuum tank of a vacuum pump unit of the vacuum pump arrangement for a milking plant without shutting down the system vacuum.

This purpose is achieved by the vacuum pump arrangement initially defined, which is characterized in that each of the vacuum pump units comprises a first closing valve provided on the first inlet conduit and configured to close the first inlet conduit in an automatic manner when the pump has been stopped.

Thanks to the first closing valve, the first inlet conduit may be closed so that no air can pass from the vacuum tank to the main vacuum conduit. The vacuum tank may thus be available for maintenance work, for instance draining, without shutting down the system vacuum of the milking plant. The system vacuum may be maintained by the other vacuum pump unit or units of the vacuum pump arrangement.

According to an embodiment of the invention, the draining valve is configured to open the drainage when the pump has been stopped and the first closing valve has been closed, thereby permitting liquid collected in the vacuum tank to escape via the drainage.

The draining valve may be configured to open the drainage in an automatic manner when the pump has been stopped and the first closing valve has been closed. The draining valve may thus be configured to initiate draining of the vacuum tank automatically, in particular when the vacuum tank is no longer subjected to vacuum and at least when atmospheric pressure prevails in the vacuum tank, which ensures a quick and exact draining of the vacuum tank.

According to an embodiment of the invention, each of the vacuum pump units comprises an inlet comprising an inlet valve and extending from the surroundings to the inlet conduit between the first closing valve and the vacuum tank.

Thanks to the inlet, ambient air may be introduced from the surroundings directly into the vacuum tank so that atmospheric pressure may prevail in the vacuum tank. Ambient air may thus be prevented from passing through the pump into the vacuum tank, which reduces risk for contamination of the vacuum pump unit.

According to an embodiment of the invention, the inlet valve is configured to open the inlet in an automatic manner when, or immediately after, the pump has been stopped and the first closing valve has been closed to permit ambient air to enter the inlet conduit from the surroundings.

According to an embodiment of the invention, each of the vacuum pump units comprises a communication connection extending from the intermediate conduit to the inlet valve, wherein the inlet valve is configured to be controlled by the pressure prevailing in the intermediate conduit via the communication connection. When the pressure increases in the intermediate conduit, this pressure increase may be transferred to the inlet valve and act on the inlet valve to open the inlet for ambient air to enter the first inlet conduit and the vacuum tank from the surroundings.

According to an embodiment of the invention, the inlet valve comprises a diaphragm valve, which may be controlled by the pressure transferred from the intermediate conduit via the communication connection.

According to an embodiment of the invention, the inlet valve comprises an electrically controlled valve communicating with a control unit configured to initiate opening of the inlet valve when the pump has been stopped. The control unit may communicate with the pump and detect when the pump has been stopped, for instance by sensing the current to a drive motor of the pump.

According to an embodiment of the invention, each of the vacuum pump units comprises an intermediate valve provided on the intermediate conduit and configured to close the intermediate conduit in an automatic manner when the pump has been stopped. The intermediate valve may thus close the intermediate conduit automatically and prevent any flow backwards through the pump into the vacuum tank when the pump has been stopped, and thus reduce the risk for contamination of the vacuum pump unit.

According to an embodiment of the invention, the communication connection extends from the intermediate conduit from a position downstream the intermediate valve. The pressure will increase at this position in the intermediate conduit, when the pump of the vacuum pump unit has been stopped.

According to an embodiment of the invention, the intermediate valve comprises a check valve. The check valve, or one-way valve, may close when the pump stops and the pressure downstream the intermediate valve increases, and thus securely prevent any back flow through the pump to the vacuum tank.

According to an embodiment of the invention, the intermediate valve comprises an electrically controlled valve communicating with a control unit configured to initiate closing of the intermediate valve when the pump has been stopped. The control unit, which may be the same control unit as mentioned above, may thus communicate with the pump and detect when the pump has been stopped, for instance by sensing the current to a drive motor of the pump.

According to an embodiment of the invention, the first closing valve comprises a check valve. The check valve, or one-way valve, may close when the pump stops and the pressure downstream the first closing valve increases, and thus securely prevent any back flow through the first inlet conduit, and thus secure that the system vacuum may be maintained although the pump has been stopped.

According to an embodiment of the invention, the first closing valve comprises an electrically controlled valve communicating with a control unit configured to initiate closing of the first closing valve when the pump has been stopped. The control unit, which may be the same control unit as mentioned above, may thus communicate with the pump and detect when the pump has been stopped, for instance by sensing the current to a drive motor of the pump.

According to an embodiment of the invention, each of the vacuum pump units comprises a filter provided in the vacuum tank downstream the inlet conduit and the draining valve, and upstream the intermediate conduit. The filter provides cleaning of air sucked into the pump.

According to an embodiment of the invention, each of the vacuum pump units comprises a second inlet conduit connecting the vacuum tank to the main vacuum conduit, wherein a second closing valve is provided on the second inlet conduit and wherein the second closing valve is configured to close the second inlet conduit in an automatic manner when the pump has been stopped.

By means of two inlet conduits, the first and second inlet conduits, a total flow area may be obtained, which may ensure a sufficient flow for maintaining the vacuum level of the system vacuum of the milking plant. Only one of the inlet conduits, i.e. the first inlet conduit, may have an inlet with an inlet valve for enabling inflow of ambient air to the vacuum tank.

The purpose is also achieved by the method defined, which comprises the steps of:
operating the pump of at least one of the vacuum pump units to suck air from the main vacuum conduit via the first inlet conduit, the vacuum tank and the intermediate conduit in order to maintain the system vacuum, and
stopping the pump of another one of the vacuum pump units and thereby automatically closing a first closing valve provided on the first inlet conduit and thus the first inlet conduit of said another one of the vacuum pump units.

The stopping of the pump and the following closing of the first inlet conduit prevent any air from flowing backwards from the vacuum tank to the main vacuum conduit. The vacuum tank may thus be available for maintenance work, and the system vacuum may be maintained by the other vacuum pump unit or units of the vacuum pump arrangement.

According to a further aspect of the invention, the method comprises the further step of:
automatically opening the draining valve and thus the drainage when the pump has been stopped and the first closing valve has been closed, thereby permitting liquid collected in the vacuum tank to escape via the drainage.

The draining of the vacuum tank may thus be initiated in an automatic manner when the vacuum tank is no longer subjected to vacuum and at least when atmospheric pressure prevails in the vacuum tank, which ensures a quick and exact draining of the vacuum tank at the same time as the system vacuum is maintained by the other vacuum pump units.

According to a further aspect of the invention, the method comprises the further step of:
automatically opening an inlet valve and thus an inlet from the surroundings to the first inlet conduit between the first closing valve and the vacuum tank when the pump has been stopped and the first closing valve has been closed to permit ambient air to enter the inlet from the surroundings.

By introducing ambient air from the surroundings directly into the vacuum tank, the pressure may increase rapidly to an atmospheric pressure level in the vacuum tank. The atmospheric pressure contribute to prevent backflow through the pump and to reduce the risk for contamination of the vacuum pump unit.

According to a further aspect of the invention, the method comprises that further step of:
automatically closing an intermediate valve provided on the intermediate conduit and thus the intermediate conduit when the pump has been stopped.

The closing of the intermediate valve also contribute to prevent backflow through the pump into the vacuum tank and to reduce the risk for contamination of the vacuum pump unit.

BRIEF DESCRIPTION OF THE DRAWINGS

The present invention is now to be explained more closely through a description of various embodiments and with reference to the drawings attached hereto.

DETAILED DESCRIPTION OF VARIOUS EMBODIMENTS

Figure 1:
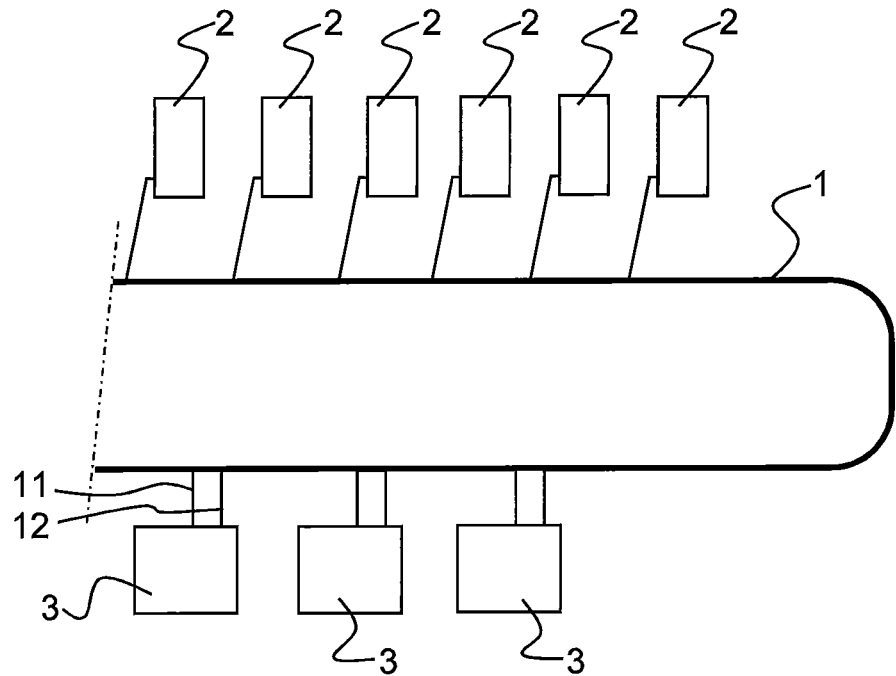
FIG. 1 discloses a schematic view of a vacuum pump arrangement of a milking plant according to the invention.

FIG. 1 discloses a vacuum pump arrangement for a milking plant. The milking plant is only schematically indicated and comprises a main vacuum conduit 1 and a plurality of milking stations 2, for instance robot milking stations having a milking machine with teatcups to be applied to an animal to be milked.

The vacuum pump arrangement comprises at least two vacuum pump units 3. In the embodiments disclosed, three vacuum pump units 3 are provided and connected to the main vacuum conduit 1, but the vacuum pump arrangement is not restricted to two or three vacuum pump units 3, but more than three vacuum pump units 3 may be comprised by the vacuum pump arrangement.

All of the vacuum pump units 3 of the vacuum pump arrangement may be equal, but should be noted that one or more of the vacuum pump units 3 may have a configuration that at least partly differs from the configuration to be described below.

The vacuum pump units 3 create a low pressure, for instance about 50 kPa below the atmospheric pressure, which forms a system vacuum. The system vacuum is transferred to the milking machines of the milking stations 2 and forms a milking vacuum and a pulsating vacuum for the operation of the milking machines in a manner known per se.

Figure 2:
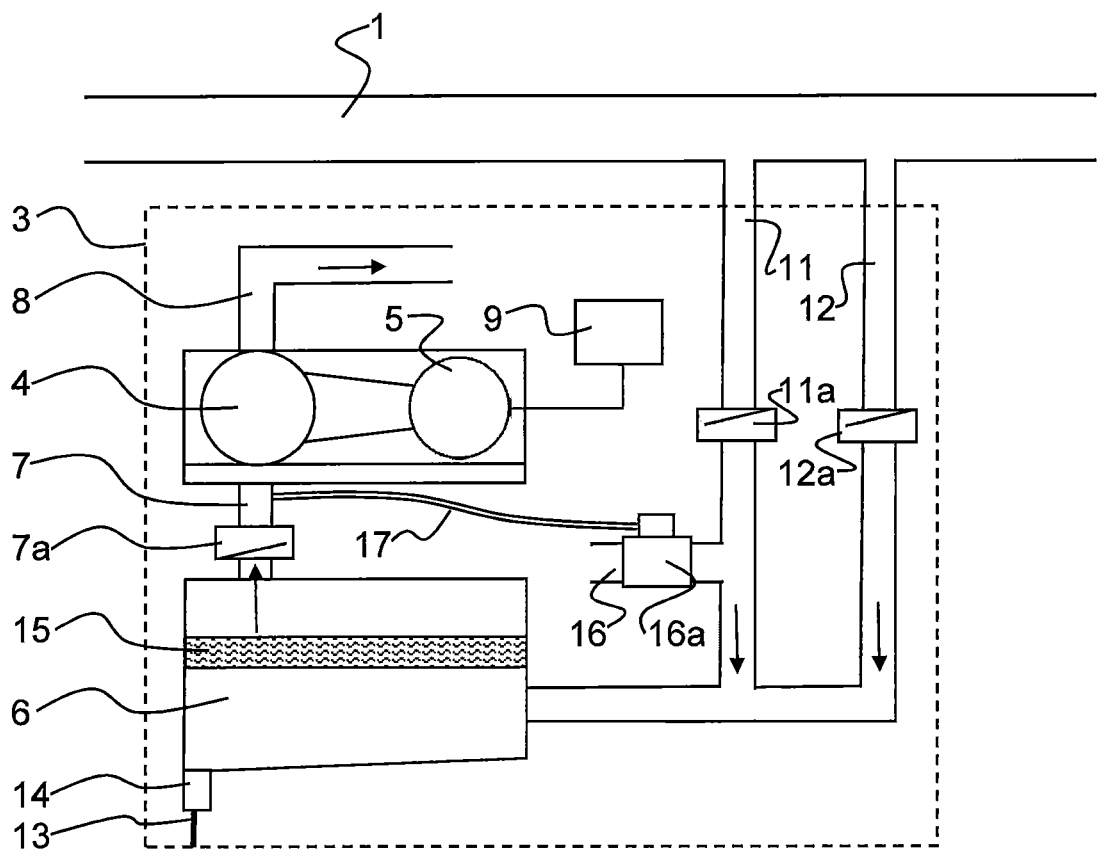
FIG. 2 discloses a schematic view of a first embodiment of a vacuum pump unit of the vacuum pump arrangement in FIG. 1.

With reference to FIG. 2, a first embodiment of one of the vacuum pump units 3 will be described. The vacuum pump unit 3 comprises a pump 4, driven by a drive motor 5, and a vacuum tank 6 connected to the pump 4 via an intermediate conduit 7. The vacuum pump unit 3 also comprises an outlet conduit 8 extending from the pump 4 to the surroundings.

The drive motor 5 may be an electric motor and may be connected to a control unit 9. The control unit 9 may communicate with the drive motor 5 and control the drive motor 5 to start and stop the drive motor 5, and consequently to start and stop the pump 4. The control unit 9 may comprise means for regulating the speed of the drive motor 5 and the pump 4.

In the first embodiment, the vacuum pump unit 3 comprises a first inlet conduit 11 and a second inlet conduit 12. The first and second inlet conduits 11, 12 connect the vacuum tank 6 to the main vacuum conduit 1.

The pump 4 is thus configured to suck air from the main vacuum conduit 1, via the first and second inlet conduits 11, 12, the vacuum tank 6 and the intermediate conduit 7, and to force the air from the pump 4 to the surroundings via the outlet conduit 8.

The vacuum pump unit 3 also comprises a drainage 13 that extends from a bottom or from a lower position of the vacuum tank 6. The drainage 13 comprises a draining valve 14, which is configured to open and close the drainage 13 in an automatic manner when the pressure in the vacuum tank 6 increases and at least when atmospheric pressure prevails in the vacuum tank 6.

Furthermore, the vacuum pump unit 3 comprises a filter 15 provided in the vacuum tank 6 downstream the first and second inlet conduits 11, 12 and the drainage 13, and upstream the intermediate conduit 7. The air sucked from the first and second inlet conduits 11, 12 will pass through the filter 15 before entering the intermediate conduit 7.

The vacuum pump unit 3 comprises an intermediate valve 7a provided on the intermediate conduit 7 and configured to close and open the intermediate conduit 7. In the first embodiment, the intermediate valve 7a comprises or consists of a check valve, or a one-way valve.

The intermediate valve 7a is configured to close the intermediate conduit 7 in an automatic manner when the pump 4 has been stopped, i.e. when the drive motor 5 has been stopped by the control unit 9. Such an automatic closing may be performed by the check valve, for instance, which closes when the pressure downstream the check valve increases.

The vacuum pump unit 3 comprises a first closing valve 11a provided on the first inlet conduit 11, and a second closing valve 12a provided on the second inlet conduit 12. In the first embodiment, the first inlet valve 11a and the second inlet valve 12a comprise or consist of a respective check valve, or a respective one-way valve.

The first and second inlet valves 11a, 12a are configured to close the first inlet conduit 11 and the second inlet conduit 12, respectively, in an automatic manner when the pump 4 has been stopped, i.e. when the drive motor 5 has been stopped by the control unit 9. Such an automatic closing may be performed by the check valve, for instance, which closes when the pressure downstream the check valve increases.

The vacuum pump unit 3 comprises inlet 16, which extends from the surroundings to the first inlet conduit 11 to a position between the first closing valve 11a and the vacuum tank 6. The inlet 16 comprises an inlet valve 16a configured to close and open the inlet 16. In particular, the inlet valve 16a is configured to open the inlet 16 in an automatic manner to permit ambient air to enter the inlet conduit 16 from the surroundings when the pump 4 has been stopped, i.e. when the drive motor 5 has been stopped by the control unit 9, and thus when the first and second closing valve 11a, 12a have been closed.

It should be noted that only one inlet 16 is needed for the first and second inlet conduits 11, 12 as can be seen in FIG. 2.

In the first embodiment, the vacuum pump unit 3 comprises a communication connection 17 extending from the intermediate conduit 7 to the inlet valve 16a. The communication connection 17 may comprise or consist of a tubular member, such as a hose. The inlet valve 16a is configured to be controlled by the pressure prevailing in the intermediate conduit 7. The pressure prevailing in the intermediate conduit 7 may thus be transferred to the inlet valve 16 via the communication connection 17. The inlet valve 16a may thus comprise or consist of a diaphragm valve or a membrane valve, wherein the pressure in the intermediate conduit 7 is transferred to and acts on the diaphragm or membrane to actuate a valve body to open or close the inlet valve 16a.

The draining valve 14 is configured to open the drainage 13 in an automatic manner when the pump 4 has been stopped, i.e. when the drive motor 5 has been stopped by the control unit 9, and thus when the first and second closing valve 11a, 12a have been closed. When the draining valve 14 is open liquid collected in the vacuum tank 6 is permitted to escape from the vacuum pump unit 3 via the drainage 13. The draining valve 14 is configured to close the drainage 13 again when the pump 4 has been started and the pressure in the vacuum tank 6 increases.

In the vacuum pump arrangement, a sufficient number of vacuum pump units 3 may operate during normal conditions to maintain the system vacuum to be used by the milking machines of the milking stations 2. When one of the vacuum pump units 3 has to be stopped, for instance for draining of the vacuum tank 6, for any other maintenance operation or for the regulation of the system vacuum, the drive motor 5 and the pump 4 of the vacuum pump unit 3 are stopped. The pressure in the intermediate conduit 7 upstream the pump 4 will then increase, which result in an automatic closing of the intermediate valve 7a and of the first and second closing valves 11a, 12a. The pressure increase will also be transferred to the inlet valve 16a via the communication connection 17, which causes the inlet valve 16a to open automatically. Ambient air will thus flow to the vacuum tank 6 via the inlet 16 so that atmospheric pressure will prevail in the vacuum tank 6. The first and second closing valves 11a, 12a and the intermediate valve 7a are configured to remain closed so that the system vacuum will be maintained by the other vacuum pump units 3 still operating.

When the pressure in the vacuum tank 6 increases, and at least when atmospheric pressure prevails therein, the draining valve 14 will open automatically to permit water or other possible liquids to escape via the drainage 13.

When the draining, the possible other maintenance operation or stopping of regulation reasons have been finished, the drive motor 5 and the pump 4 may be restarted. The pressure in the intermediate conduit 7 will decrease which result in an automatic opening of the intermediate valve 7a and an automatic closing of the inlet valve 16a. This leads to a decrease of the pressure in the vacuum tank 5 and the first and second inlet conduits 11, 12, which results in an automatic opening of the first and second inlet valves 11a, 12a, wherein the vacuum pump unit again may contribute to maintaining the system vacuum.

Figure 3:
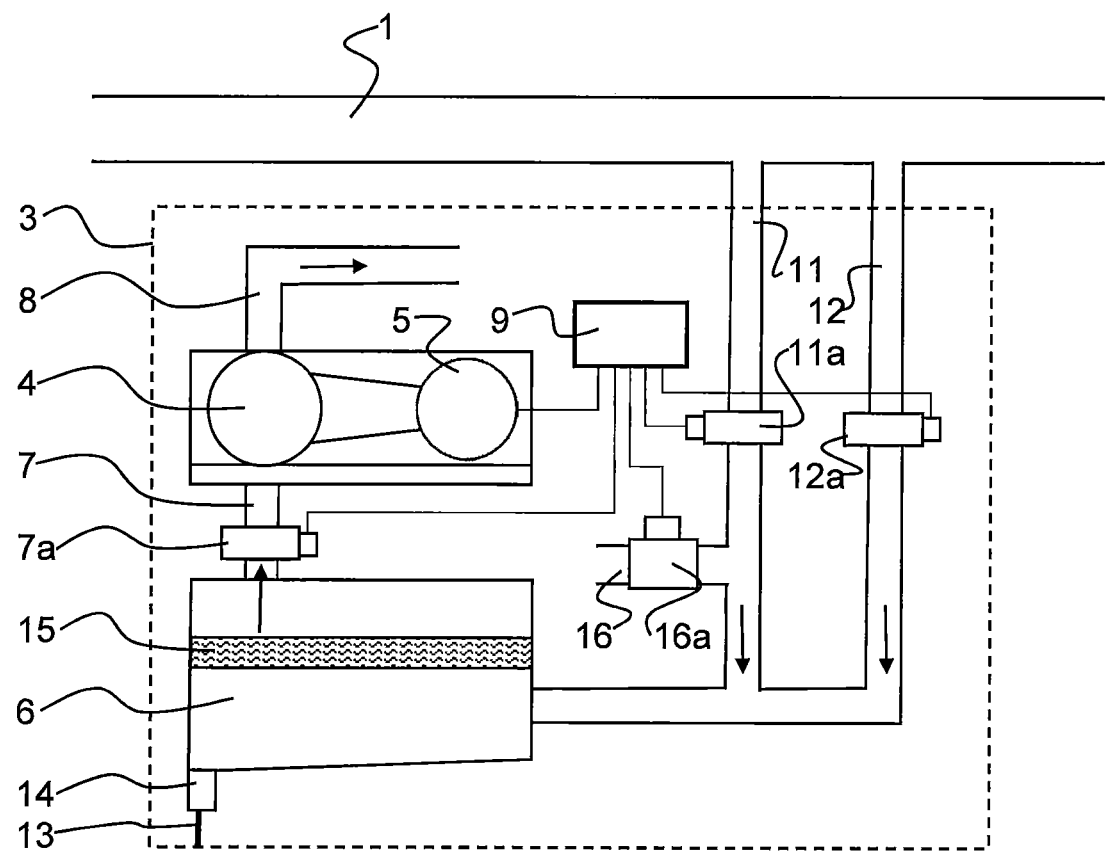
FIG. 3 discloses a schematic view of a second embodiment of a vacuum pump unit of the vacuum pump arrangement in FIG. 1.

With reference to FIG. 3, a second embodiment of one of the vacuum pump units 3 will be described. The second embodiment differs from the first embodiment with regard to the configuration of the valves. As will be described one or more of the first and second closing valves 11a, 12a, the intermediate valve 7a and the inlet valve 16a may be modified, and may be replaced by a respective electrically controlled valve.

In the second embodiment, the inlet valve 16a may thus comprise an electrically controlled valve that communicates with the control unit 9. The control unit 9 may control the inlet valve 16a to initiate opening of the inlet valve 16a when the pump 4 has been stopped. The control unit 9 may detect when the drive motor 5, and thus the pump 4, has been stopped, for instance by sensing the current to the drive motor 5 of the pump 4.

Furthermore, the intermediate valve 7a of the second embodiment may comprise an electrically controlled valve that communicates with the control unit 9. The control unit 9 may control the intermediate valve 7a to initiate closing of the intermediate valve 7a when the pump 4 has been stopped.

Still further, the first closing valve 11a and the second closing valve 12a of the second embodiment may comprise a respective electrically controlled valve, which both communicate with the control unit 9. The control unit 9 may control the first and second closing valves 11a, 12a to initiate closing of the first and second closing valve 11a, 12a when the pump 4 has been stopped.

According to a further embodiment of the invention, it is possible to dispense with the second inlet conduit 12 and thus the second closing valve 12 both in the first and second embodiments. Only the first inlet conduit 11 may be sufficient.

The present invention is not limited to the embodiment disclosed but may be varied and modified within the scope of the following claims.

The invention claimed is:

1. A vacuum pump arrangement for a milking plant, the vacuum pump arrangement comprising:
 a main vacuum conduit; and
 at least two vacuum pump units arranged to maintain a system vacuum in the main vacuum conduit, each of the vacuum pump units comprising
 i) a pump,
 ii) a vacuum tank connected to the pump by an intermediate conduit,
 iii) at least a first inlet conduit connecting the vacuum tank to the main vacuum conduit,
 iv) a drainage extending from the vacuum tank and comprising a draining valve, the intermediate conduit extended from the vacuum tank to the pump, and
 v) a first closing valve provided on the first inlet conduit and defining an airpath from the vacuum tank to the main vacuum conduit,
 wherein the pump is configured to suck air from the main vacuum conduit to the pump via a path defined by the first inlet conduit, the vacuum tank and the intermediate conduit, and
 wherein the first closing valve provided on the first inlet conduit is configured to close the first inlet conduit in an automatic manner when the pump has been stopped thereby closing the airpath from the vacuum tank to the main vacuum conduit and allowing, without shutting down the system vacuum in the main vacuum conduit, the draining valve to open the drainage when the pump has been stopped and the first closing valve has been closed, thereby permitting liquid collected in the vacuum tank to escape via the drainage.

2. The vacuum pump arrangement according to claim 1, wherein the draining valve is configured to open the drainage when the pump has been stopped and the first closing valve has been closed, thereby permitting liquid collected in the vacuum tank to escape via the drainage, and wherein each of the vacuum pump units comprises a filter that provides cleaning of air sucked into the pump, the filter provided in the vacuum tank downstream the inlet conduit and the draining valve, and upstream the intermediate conduit.

3. The vacuum pump arrangement according to claim 2, wherein each of the vacuum pump units comprises an inlet comprising an inlet valve and extending from the surroundings to the first inlet conduit between the first closing valve and the vacuum tank.

4. The vacuum pump arrangement according to claim 3, wherein the inlet valve is configured to open the inlet in an automatic manner when the pump has been stopped and the first closing valve has been closed to permit ambient air to enter the inlet from the surroundings.

5. The vacuum pump arrangement according to claim 4, wherein each of the vacuum pump units comprises a communication connection extending from the intermediate conduit to the inlet valve, wherein the inlet valve is configured to be controlled by the pressure prevailing in the intermediate conduit via the communication connection.

6. The vacuum pump arrangement according to claim 5, wherein the inlet valve comprises a diaphragm valve.

7. The vacuum pump arrangement according to claim 4, wherein the inlet valve comprises an electrically controlled valve communicating with a control unit configured to initiate opening of the inlet valve when the pump has been stopped.

8. The vacuum pump arrangement according to claim 1, wherein each of the vacuum pump units comprises an intermediate valve provided on the intermediate conduit and configured to close automatically the intermediate conduit when the pump has been stopped.

9. The vacuum pump arrangement according to claim 5, wherein,
 each of the vacuum pump units comprises an intermediate valve provided on the intermediate conduit and configured to close automatically the intermediate conduit when the pump has been stopped, and the communication connection extends from the intermediate conduit from a position downstream the intermediate valve.

10. The vacuum pump arrangement according to claim 8, wherein the intermediate valve comprises a check valve.

11. The vacuum pump arrangement according to claim 8, wherein the intermediate valve comprises an electrically controlled valve communicating with a control unit configured to initiate closing of the intermediate valve when the pump has been stopped.

12. The vacuum pump arrangement according to claim 1, wherein the first closing valve comprises a check valve.

13. The vacuum pump arrangement according to claim 1, wherein the first closing valve comprises an electrically controlled valve communicating with a control unit configured to initiate closing of the first closing valve when the pump has been stopped.

14. The vacuum pump arrangement according to claim 1, wherein each of the vacuum pump units comprises a filter provided in the vacuum tank downstream the first inlet conduit and the drainage, and upstream the intermediate conduit.

15. The vacuum pump arrangement according to claim 1, wherein each of the vacuum pump units comprises a second inlet conduit connecting the vacuum tank to the main vacuum conduit, wherein a second closing valve is provided on the second inlet conduit and wherein the second closing valve is configured to close the second inlet conduit in an automatic manner when the pump has been stopped.

16. The vacuum pump arrangement according to claim 1, wherein, each of the vacuum pump units further comprises an inlet comprising an inlet valve and extending from the surroundings to the first inlet conduit between the first closing valve and the vacuum tank, the inlet valve is configured to open the inlet in an automatic manner when the pump has been stopped and the first closing valve has been closed to permit ambient air to enter the inlet from the surroundings, each of the vacuum pump units comprises a communication connection extending from the intermediate conduit to the inlet valve, wherein the inlet valve is configured to be controlled by the pressure prevailing in the intermediate conduit via the communication connection, and the inlet valve comprises a diaphragm valve.

17. The vacuum pump arrangement according to claim 1, wherein, each of the vacuum pump units further comprises an inlet comprising an inlet valve and extending from the surroundings to the first inlet conduit between the first closing valve and the vacuum tank, the inlet valve is configured to open the inlet in an automatic manner when the pump has been stopped and the first closing valve has been closed to permit ambient air to enter the inlet from the surroundings, and the inlet valve comprises an electrically controlled valve communicating with a control unit configured to initiate opening of the inlet valve when the pump has been stopped.

* * * * *